US012648056B2

(12) United States Patent
Rafanello

(10) Patent No.: US 12,648,056 B2
(45) Date of Patent: Jun. 2, 2026

(54) MICROWAVE OVEN AND MICROWAVE OVEN INSERT

(71) Applicant: Salvatore P Rafanello, Morristown, NJ (US)

(72) Inventor: Salvatore P Rafanello, Morristown, NJ (US)

( * ) Notice: Subject to any disclaimer, the term of this patent is extended or adjusted under 35 U.S.C. 154(b) by 1041 days.

(21) Appl. No.: 17/804,298

(22) Filed: May 26, 2022

(65) Prior Publication Data

US 2023/0050267 A1 Feb. 16, 2023

Related U.S. Application Data

(60) Provisional application No. 63/231,300, filed on Aug. 10, 2021.

(51) Int. Cl.
*H05B 6/64* (2006.01)

(52) U.S. Cl.
CPC .................................. *H05B 6/6411* (2013.01)

(58) Field of Classification Search
CPC ........ H05B 6/6411; H05B 6/74; H05B 6/745; F24C 7/02
USPC ................................. 219/753, 754, 762, 756
See application file for complete search history.

(56) References Cited

U.S. PATENT DOCUMENTS

| | | | | |
|---|---|---|---|---|
| 5,672,291 | A | 9/1997 | Han | |
| 5,736,716 | A | 4/1998 | Kim et al. | |
| 6,076,957 | A * | 6/2000 | Gomes | B01F 35/32 219/726 |
| 7,202,455 | B2 | 4/2007 | Choi | |
| 8,384,001 | B2 | 2/2013 | Jeong | |

OTHER PUBLICATIONS

Konno, JP H0845656 A (Year: 1996).*
Li, CN 1769792 A (Year: 2006).*

* cited by examiner

*Primary Examiner* — Vy T Nguyen

(57) ABSTRACT

A platform system is disclosed for use to support an item to be cooked in a microwave oven having a motor, a cooking space having a bottom surface, and a rotor centrally located at the bottom surface, wherein the motor is disposed outside of the cooking space and is configured to rotate the rotor. The platform system includes an adaptor, a mounting plate, a gear system, and a moveable plate. The adaptor is configured to engage the rotor and thereby rotate with the rotor. The gear system is in mechanical communication with the adaptor so as to move with rotation of the adaptor. The moveable plate is configured to support the item and to rotate and revolve about the cooking space based on motion of the gear system so as to rotate and to revolve the item about the cooking space.

20 Claims, 11 Drawing Sheets

MICROWAVE OVEN AND MICROWAVE OVEN INSERT

The present application claims priority from U.S. Provisional Application No. 63/231,300 filed Aug. 10, 2021, the entire disclosure of which is incorporated herein by reference.

BACKGROUND

Embodiments of the disclosure relate to microwave ovens and inserts for microwave ovens.

SUMMARY

An aspect of the present disclosure is drawn to a platform system for use to support an item to be cooked in a microwave oven having a motor, a cooking space having a bottom surface, a rotor, and a rotor adaptor centrally located at the bottom surface, wherein the motor is disposed outside of the cooking space and is configured to rotate the rotor, and wherein the rotor is disposed outside of the cooking space and is configured to rotate the rotor adaptor within the cooking space. The platform system includes an adaptor, a mounting plate, a gear system, and a moveable plate. The adaptor is configured to engage the rotor adaptor and thereby rotate with the rotor. The gear system is in mechanical communication with the adaptor so as to move with rotation of the adaptor. The moveable plate is configured to support the item and to rotate and revolve about the cooking space based on motion of the gear system so as to rotate and to revolve the item about the cooking space.

In some embodiments of this aspect, the gear system is disposed between the mounting plate and the moveable plate, and the mounting plate is disposed between the adaptor and the gear system.

In some embodiments of this aspect, the gear system includes: an inner sun gear; a carriage; an armature in mechanical communication with the adaptor and the carriage so as to revolve the carriage about the inner sun gear with rotation of the adaptor; a planetary gear mounted within the carriage and arranged to rotate and to revolve around the inner sun gear with rotation of the armature; and a compound planetary gear connected to the carriage and arranged to rotate and to revolve around the inner sun gear. The moveable plate has a top surface and a bottom surface, wherein the top surface is configured to support the item, and the bottom surface includes a toothed ring configured to engage with the compound planetary gear. In some of these embodiments, the platform system is for further use to support a bowl to contain a material as the item to be cooked in the microwave oven, wherein the platform system further includes: a rotating magnet disposed at the planetary gear, arranged to rotate with the planetary gear and configured to produce a magnetic field that rotates with the rotation of the rotating magnet; and a removable magnet to be disposed in the bowl and configured to magnetically align with the rotating magnetic field of the rotating magnet so as to rotate within the material in the bowl so as to stir the material in the bowl.

In some embodiments of this aspect, the mounting plate includes: an under surface configured to be disposed to face the bottom surface of the cooking space; and a plurality of adjustable mounts, each being configured to adjust its respective height so as to collectively adjust a space between the under surface of the mounting plate and the bottom surface of the cooking space. In some of these embodiments, the platform system further includes a mount magnet disposed at one of the plurality of adjustable mounts and being configured to magnetically attract the one of the plurality of adjustable mounts to the bottom surface of the cooking space so as to prevent rotation of the one of the plurality of adjustable mounts about the bottom surface of the cooking space. In some of these embodiments, the mount magnet comprises a material selected from the group of materials including ceramics, neodymium, graphene, and combinations thereof.

In some embodiments of this aspect, the platform system is for further use to support a second item to be cooked in the microwave oven, wherein the platform system further includes a second gear system and a second moveable plate. The second gear system is in mechanical communication with the adaptor so as to move with rotation of the adaptor. The moveable plate is configured to support the item and to rotate about the cooking space at a first angular velocity. The second moveable plate is configured to support the second item and to rotate and revolve about the cooking space based on motion of the second gear system so as to rotate and revolve the second item about the cooking space. The second moveable plate is configured to support the second item and to rotate about the cooking space at a second angular velocity that is different than the first angular velocity. In some of these embodiments, the second gear system is disposed between the mounting plate and the second moveable plate, and the mounting plate is disposed between the adaptor and the second gear system.

Another aspect of the present disclosure is drawn to a microwave oven for use with an item to be cooked, wherein the microwave oven includes: a cooking space having a bottom surface; a rotor centrally located at the bottom surface; a motor being disposed outside of the cooking space and being configured to rotate the rotor; and platform system including a gear system, and a moveable plate, wherein the gear system is in mechanical communication with the rotor so as to move with rotation of the rotor, and wherein the moveable plate is configured to support the item and to rotate and revolve about the cooking space based on motion of the gear system so as to rotate and to revolve the item about the cooking space.

In some embodiments of this aspect, the gear system is disposed below the moveable plate.

In some embodiments of this aspect, the gear system includes: an inner sun gear in mechanical communication with the rotor so as to rotate with rotation of the rotor; a carriage; an armature in mechanical communication with the rotor and the carriage so as to revolve the carriage about the inner sun gear with rotation of the rotor; a planetary gear mounted within the carriage and arranged to rotate and revolve around the inner sun gear with rotation of the armature; and a compound planetary gear connected to the carriage and arranged to revolve around inner sun gear, wherein the moveable plate has a top surface and a bottom surface, the top surface being configured to support the item, the bottom surface including a toothed ring configured to engage with the compound planetary gear. In some of these embodiments, the microwave oven is for further use to support a bowl to contain a material as the item to be cooked, wherein the platform system further includes: a rotating magnet disposed at the planetary gear, arranged to rotate with the planetary gear and configured to produce a magnetic field that rotates with the rotation of the rotating magnet; and a removable magnet to be disposed in the bowl and configured to magnetically align with the rotating magnetic field of the rotating magnet so as to rotate within the material in the bowl so as to stir the material in the bowl.

In some embodiments of this aspect, the microwave oven is for further use to support a second item to be cooked, wherein the platform system further includes a second gear system, and a second moveable plate, wherein the second gear system is in mechanical communication with the rotor so as to move with rotation of the rotor, wherein the moveable plate is configured to support the item and to rotate about the cooking space at a first angular velocity, wherein the second moveable plate is configured to support the second item and to rotate and revolve about the cooking space based on motion of the gear system so as to rotate and revolve the item about the cooking space, and wherein the moveable plate is configured to support the item and to rotate about the cooking space at a second angular velocity that is different than the first angular velocity. In some of these embodiments, the second gear system is disposed between the mounting plate and the second moveable plate.

BRIEF SUMMARY OF THE DRAWINGS

The accompanying drawings, which are incorporated in and form a part of the specification, illustrate example embodiments and, together with the description, serve to explain the principles of the disclosure. In the drawings.

DETAILED DESCRIPTION

A microwave oven heats food by subjecting the food within the cooking space to emitted electromagnetic waves in the microwave spectrum. In particular, microwave oven emits waves at a frequency band that resonates well with the water molecule, i.e., $H_2O$. When water molecules are exposed to the oscillating wave fronts, the water molecules themselves then start to vibrate. This vibration, or kinetic energy, translates in into friction, thus providing thermal energy to the food. However, all areas within the cooking space are not heated at the same rate as a result of the formation of standing waves. This is why food may be warm in one area but cooler in another area. This will be described in greater detail with reference to FIG. 1.

Figure 1:
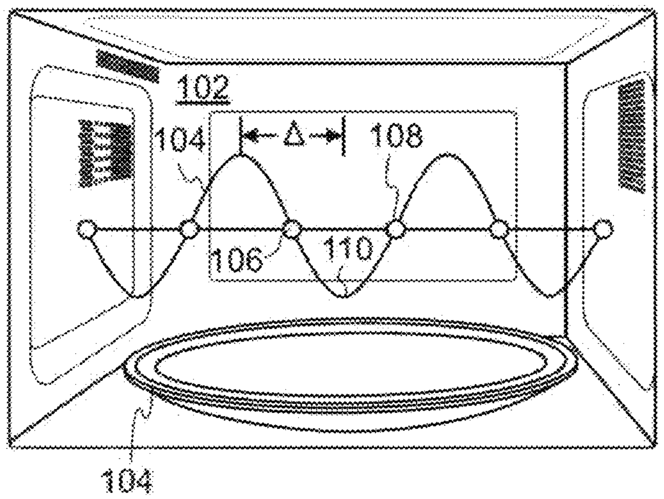
FIG. 1 illustrates wave structure within a cooking space in a microwave oven.

FIG. 1 illustrates wave structure within a cooking space in a microwave oven 100.

As shown in the figure, microwave oven 100 has a cooking space 102 and a plate 104 to receive a plate or bowl of food to be cooked. Electromagnetic waves are emitted into cooking space 102. These electromagnetic waves form standing waves as illustrated by standing wave 104.

Being a standing wave, standing wave 104 includes a plurality of nodes, a sample of which are indicated by nodes 106 and 108, wherein there is no oscillation and therefore no resonation with the water molecules at those points. Therefore, there is little heating of the food in these areas of cooking space 102.

On the other hand, standing wave 104 additionally includes a plurality of anti-nodes, a sample of which is indicated by anti-node 110, wherein there is maximum oscillation and therefore maximum resonation with the water molecules at those points. Therefore, there is maximized heating of the food in these areas of cooking space 102. It should be noted that standing wave 104 is merely representative and is not drawn to size. In particular, the linear distance, A, between a maximum amplitude and minimum amplitude of a typical standing wave within a microwave oven is on the order of a few centimeters.

Further, the standing waves cover cooking space 102 such that there are a plurality of lower heating areas and higher heating areas. This will be described in greater detail with reference to FIG. 2.

Figure 2:
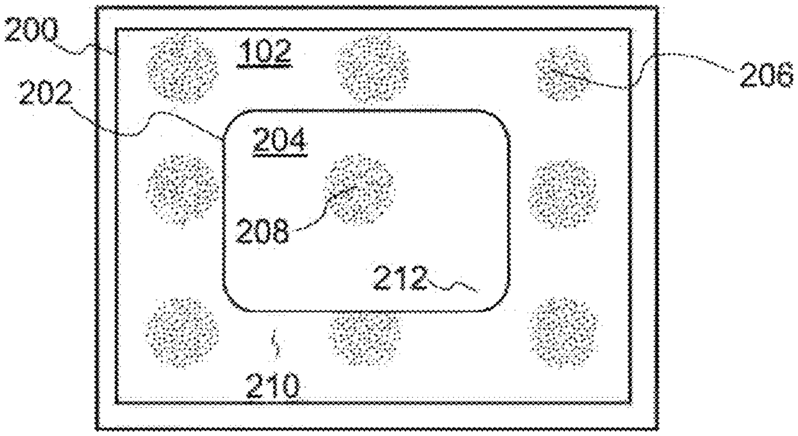
FIG. 2 illustrates a cross-sectional view of the energy magnitude footprint of a cooking space within a microwave oven.

FIG. 2 illustrates a cross-sectional area 200 of the energy magnitude footprint of cooking space 102 within microwave oven 100.

As shown in the figure, a dish 202 having food 204 therein is disposed within cooking space 102. A plurality of shaded areas represents anti-nodes, samples of which include shaded area 206 and shaded area 208, wherein there is maximum oscillation and therefore maximum resonation with the water molecules at those points. The remaining unshaded areas represent nodes, samples of which include unshaded area 210 and unshaded area 212, wherein there is less oscillation and therefore less resonation with the water molecules at those points.

Because of the heating differences, the portion of food 204 at shaded area 208 is heated more than the portion of food 204 at unshaded area 212. This leads to uneven temperature throughout food 204. Prior art attempts to address this situation include a system configured to rotate food in the cooking space. This will be described in greater detail with reference to FIGS. 3-8.

Figure 3:
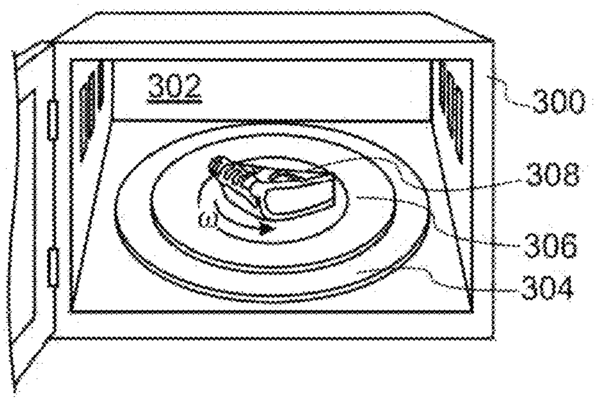
FIG. 3 Prior Art
FIG. 3 illustrates a prior art microwave oven.

FIG. 3 illustrates a prior art microwave oven 300.

As shown in the figure, microwave oven 300 includes a cooking space 302 and a rotatable plate 304. A plate 306 holding food 308 to be cooked is placed on rotatable plate 304.

In operation, when cooking rotatable plate 304 rotates at an angular velocity co, thus rotating plate 306 and therefore rotating food 308. This will be described with reference to FIG. 4.

Figure 4:
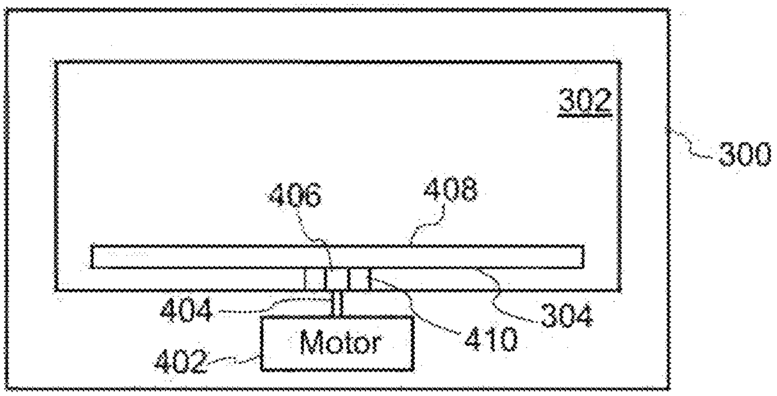
FIG. 4 Prior Art
FIG. 4 illustrates a cross-sectional view of the prior art microwave oven of FIG. 3.

FIG. 4 illustrates a cross-sectional view of the prior art microwave oven of FIG. 3.

As shown in FIG. 4, microwave oven 300 includes a motor 402, a rotor 404 and a rotor adaptor 410. Rotatable plate 304 has an upper surface 408 and an adapting portion 406. Upper surface 408 is the surface onto which a plate or bowl is to be placed in order to cook food. Adapting portion 406 is configured to engage with rotor adaptor 410. This will be described in greater detail with reference to FIGS. 5-6.

Figure 5:
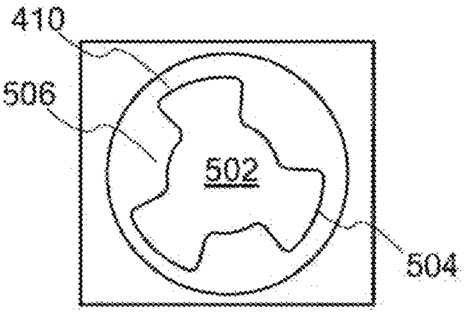
FIG. 5 Prior Art
FIG. 5 illustrates a prior art adaptor of the prior art microwave oven of FIG. 4.

FIG. 5 illustrates an example rotor adaptor 410 of microwave oven of 300.

As shown in the figure, rotor adaptor 410 includes a central portion 502 with a plurality of radially extending protrusions, a sample of which is indicated as protrusion 504. Each of the plurality of radially extending protrusions are separated from one another by a space, a sample of which is indicated as space 506. In this example, rotor adaptor 410 includes three radially extending protrusions, however, any number may be used, so long as rotor adaptor 410 may engage with adapting portion 406. This will be described in more detail with reference to FIG. 6.

Figure 6:
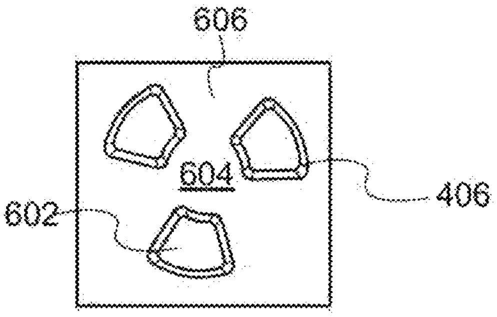
FIG. 6 Prior Art
FIG. 6 illustrates prior art protrusions on the bottom of a rotatable dish of the prior art microwave oven of FIG. 4.

FIG. 6 illustrates adapting portion 406 of rotatable dish 304 of microwave oven of 300.

As shown in the figure, adapting portion 406 includes a plurality of protrusions, a sample of which is indicated as protrusion 602. The plurality of protrusions surrounds a flat central portion 604. Further, each of the plurality of protrusions are separated from one another by a space, a sample of which is indicated as space 606.

In operation, when rotatable plate 304 is disposed on top of rotor adaptor 410, central portion 502 of rotor adaptor 410 fits into flat central portion 604 of adapting portion 406. Further, the plurality of radially extending protrusions of rotor adaptor 410 fit into respective spaces of adapting portion 406. Similarly, the plurality of protrusions of adapting portion 406 fit into the plurality of spaces in rotor adaptor 410. As such, when rotor adaptor 410 rotates, the plurality of radially extending protrusions of rotor adaptor 410 push on the plurality of protrusions of adapting portion 406 causing rotatable plate 304 to rotate at an angular velocity that is equal to that of the rotation of rotor adaptor 410.

Returning to FIG. 4, in operation, when cooking, motor 402 turns rotor 404, which turns rotor adaptor 410, which therefore turns adapting portion 406. As a result rotatable plate 304 rotates. In this manner, the food being cooked is rotated around cooking space 302. This will be described in greater detail with reference to FIG. 7.

Figure 7:
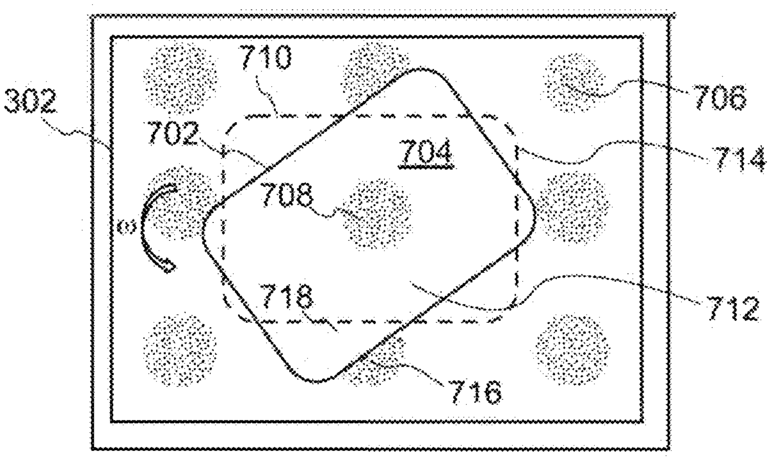
FIG. 7 Prior Art
FIG. 7 illustrates a cross-sectional view of the energy magnitude footprint of a cooking space within the prior art microwave oven of FIG. 4.

FIG. 7 illustrates a cross-sectional view of the energy magnitude footprint of a cooking space within the prior art microwave oven of FIG. 4.

As shown in FIG. 7, a dish 702 having food 704 therein is disposed within cooking space 302. A plurality of shaded areas represents anti-nodes, samples of which include shaded area 706 and shaded area 708, wherein there is maximum oscillation and therefore maximum resonation with the water molecules at those points. The remaining unshaded areas represent nodes, samples of which include unshaded area 710 and unshaded area 712, wherein there is less oscillation and therefore less resonation with the water molecules at those points.

Dashed outline 714 represents the position of dish 702 at a time $t_0$. Dish 702 rotates at an angular velocity ω with rotatable plate 304 (not shown) so as to have a position 716 at a time $t_1$. As compared with the stationary example discussed above with reference to FIG. 2, in this example, as dish 702 rotates in cooking space 302, more places of food 704 will be subjected to higher heating areas. For example, as shown by area 718 within food 704.

While this system is better than the stationary system discussed above with reference to FIG. 2, in the system of FIG. 7, there are still many areas in food 704 that are unevenly heated. For example the area in food 704 at shaded area 708 will constantly be heated at the maximum amount. On the other hand, the area in food 704 at unshaded area 712 that is around shaded area 708 will constantly be heated at a minimum amount.

Some people have experienced the problems with uneven heating of food in prior art microwave ovens. One method to address this issue will be discussed with reference to FIG. 8.

Figure 8:
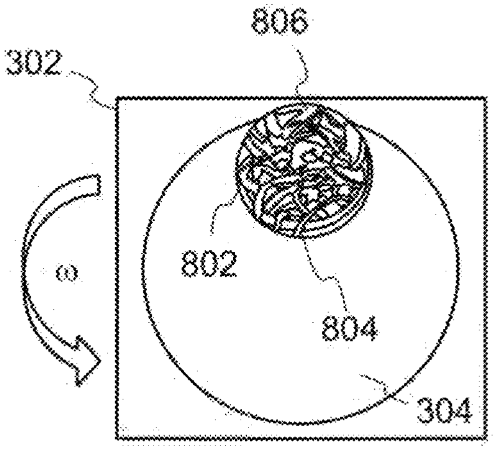
FIG. 8 Prior Art
FIG. 8 illustrates a prior art method of using the prior art microwave oven of FIG. 4.

FIG. 8 illustrates a prior art method of using the prior art microwave oven of FIG. 4.

As shown in FIG. 8, a person has placed a bowl 802 full of food 804 on the outer perimeter of rotatable plate 304 within cooking space 302. This placement is an attempt to have food 804 pass through many nodes and anti-nodes as it revolves around cooking space 302 at an angular velocity ω. However, the furthest radial portion 806 of food 804 in bowl 802 will pass through different amounts of nodes and anti-nodes as compared with the nearest radial portion 806 of food in bowl 802. This again leads to uneven heating of food 804 in bowl 802.

To combat this problem, a person might stop the cooking process, and then: rotate bowl 802 by some amount and continue the cooking process; reorient food 804 in bowl 802 by physically moving food 804 (and risk burning themselves) and continue the cooking process; or stir/mix food 804 in bowl 802 with a utensil and continue the cooking process. While this might provide a somewhat more even heating of food 804 in bowl 802, the process is cumbersome as the person has to wait by the microwave oven until the multiple steps of starting, stopping, rotating the bowl, and restarting are completed.

What is needed is a system for more even cooking in a microwave oven without having to manually stop the microwave oven and manually rotate or mix the food in the microwave oven.

A platform system in accordance with the present disclosure enables more even cooking in a microwave oven without having to manually stop the microwave oven and manually rotate the food in the microwave oven.

In accordance with an aspect of the present disclosure, an insert is used in a microwave oven having a motor that rotates a rotor adaptor located on the bottom of the inner surface of the cooking space. The insert includes a movable plate for which a bowl having food to be cooked therein or a plate having food to be cooked thereon, may be placed in order to cook the food. The insert is configured to be disposed on the bottom of the inner surface of the cooking space so as to engage with the rotor adaptor.

When cooking, the motor rotates the adaptor, which causes the movable plate to revolve and rotate about bottom of the inner surface of the cooking space. By rotating and revolving the movable plate, the food will also revolve and rotate about the cooking space. Accordingly, more of the food will pass through the areas within the cooking space that have anti-nodes of the standing microwaves, which have the highest energy. This will more evenly distribute that energy applied to the entirety of the food, thus providing a more even heating of the food.

In accordance with another aspect of the present disclosure, a removable magnet is used in conjunction with an insert having a movable plate that revolves and rotates about bottom of the inner surface of the cooking space. In this aspect, the insert additionally includes a magnet configured to rotate. The removable magnet is used to stir liquids or light fare. In particular, when heating a liquid, such as soup, or heating light fare, such as rice, the removable magnet is placed in the bowl with the liquid or light fare. While cooking, the food will also revolve and rotate about the cooking space as discussed above. However, the magnet within the insert will magnetically couple with the removable magnet in the food. As the magnet within the insert rotates, the magnetically coupled removable magnet in the food will correspondingly rotate, thus stirring the liquid or light fare while it is cooking.

This magnetic stirring will reduce the risk of superheated pockets, which can develop in liquid-based items while being cooked in a microwave oven, and which can lead to unpleasant explosions, also known as splatter. Accordingly, this will slow down the splatter because the stirring process is breaking up potential superheated pockets.

In accordance with another aspect of the present disclosure, a microwave oven includes a movable plate for which a bowl having food to be cooked therein or a plate having food to be cooked thereon, may be placed in order to cook the food.

An example rotating and revolving microwave insert in accordance with aspects of the present disclosure will now be described in greater detail with reference to FIGS. 9A-17.

Figure 9A:
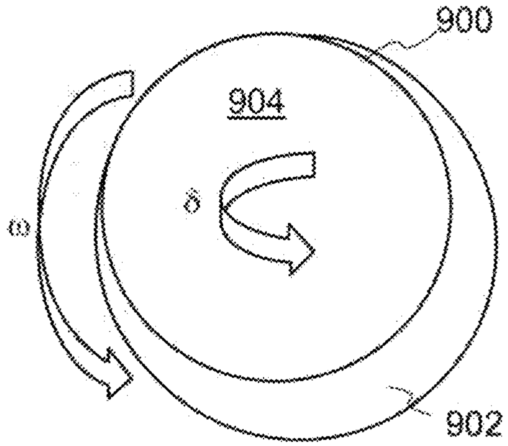
FIG. 9A illustrates a plan view of an example platform system in accordance with aspects of the present disclosure.

FIG. 9A illustrates a plan view of an example platform system 900 in accordance with aspects of the present disclosure.

As shown in the figure, platform system 900 includes a mounting plate 902 and a moveable plate 904. Mounting plate 902 is configured to remain stationary. Moveable plate 904 is configured to support an item, such as a plate or bowl of food. Moveable plate 904 is additionally configured to rotate at an angular velocity δ and revolve at an angular velocity ω about the cooking space so as to rotate and to revolve the item about the cooking space.

In some embodiments, angular velocity δ is in the same direction, e.g., clockwise or counter-clockwise, as angular velocity ω. In other embodiments, angular velocity δ is in the opposite direction as angular velocity ω. As will be described in greater detail below, in some embodiments that include a removable magnet to be disposed in a bowl to stir the material in the bowl, angular velocity δ is in the opposite direction as angular velocity ω increases the ability of the removable magnet to mix the material in the bowl.

This will be described in greater detail with reference to FIG. 10.

Figure 10:
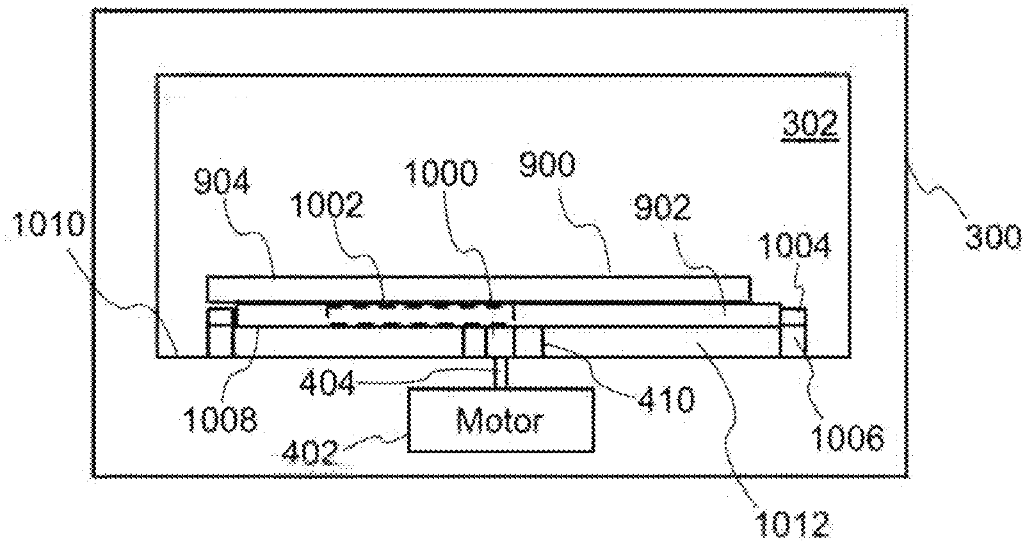
FIG. 10 illustrates a cross-sectional view of the prior art microwave oven of FIG. 3 having the example platform system of FIG. 9A therein.

FIG. 10 illustrates a cross-sectional view of microwave oven 300 having platform system 900 replacing rotatable plate 304 therein.

As shown in the figure, platform system 900 additionally includes an adaptor 1000, a gear system 1002 and a plurality of adjustable mounts, a sample of which is indicated as adjustable mount 1004, Mounting plate 902 has an under surface 1008 that faces a bottom surface 1010 of cooking space 302, and is separated from bottom surface 1010 by a height 1012. Height 1012 is at least as high as the thickness of rotor adaptor 410. At least one of the adjustable mounts includes a device or material to prevent rotation of mounting plate 902. Non-limiting examples of such devices or materials to prevent rotation of mounting plate 902 include adhesives and magnets.

In some embodiments, each adjustable mount includes a mount magnet, a sample of which is indicated as mount magnet 1006 in adjustable mount 1004. As will be described in greater detail below, in some embodiments, mount magnet 1006 is made of a material selected from group of materials comprising ceramics, neodymium, graphene, and combinations thereof. As will be described in greater detail below, in some embodiments, mount magnet 1006 is configured to magnetically attract adjustable mount 1004 to bottom surface 1010 of cooking space 302 so as to prevent rotation of adjustable mount 1004 about bottom surface 1010 of cooking space 302

As will be described in greater detail below, in some embodiments, each of the plurality of adjustable mounts is configured to adjust its respective height so as to collectively adjust space between under surface 1008 of mounting plate 902 and bottom surface 1010 of cooking space 302.

As will be described in greater detail below, in some embodiments, adaptor 1000 is configured to engage rotor adaptor 410 and thereby rotate with rotor 404, gear system 1002 is in mechanical communication with adaptor 1000 so as to move with rotation of adaptor 1000, and moveable plate 904 is configured to support an item and to rotate and revolve about cooking space 302 based on motion of gear system 1002 so as to rotate and to revolve item about cooking space 302.

As will be described in greater detail below, in some embodiments, gear system 1002 is disposed between mounting plate 902 and moveable plate 904, and mounting plate 902 is disposed between adaptor 1000 and gear system 1002.

Figure 11:
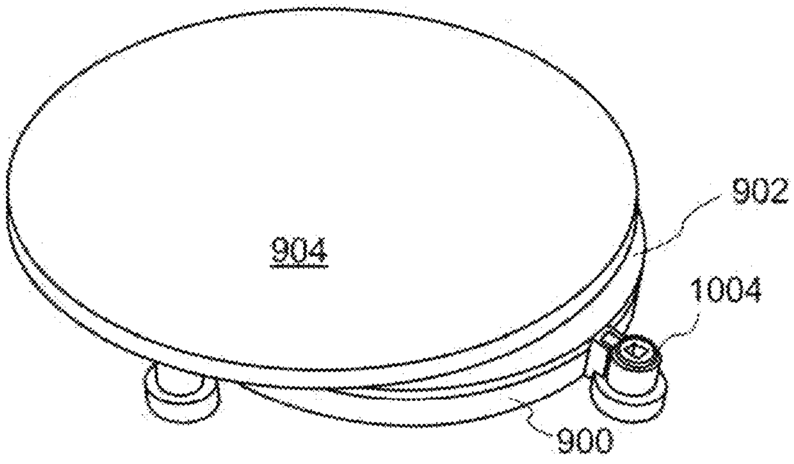
FIG. 11 illustrates an oblique view of the example platform system of FIGS. 9A-C.

FIG. 11 illustrates an oblique view of platform system 900.

Figure 12:
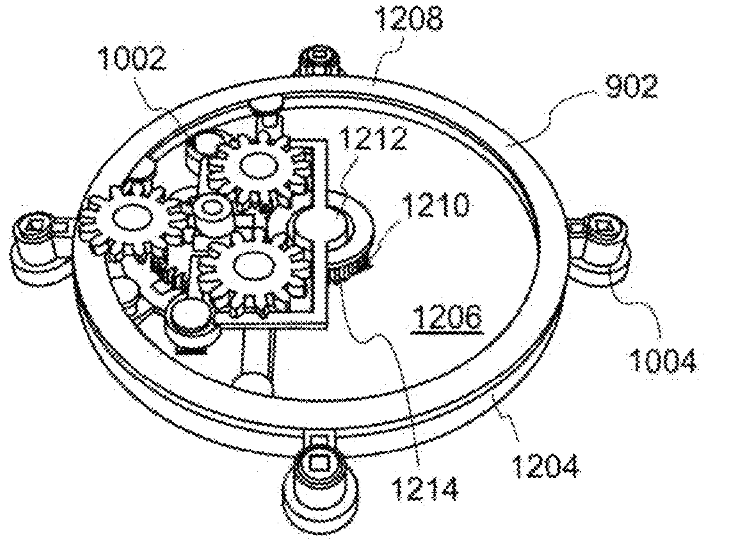
FIG. 12 illustrates an oblique view of a mounting plate and a gear system of the example platform system of FIG. 11.

FIG. 12 illustrates an oblique view of mounting plate 902 (moveable plate 904 having been removed) and a gear system 1002 of platform system 900.

As shown in the figure, mounting plate 902 has a circumferential wall 1204, an inner bottom surface 1206, a retaining ring 1208, and an inner sun gear 1210. Inner sun gear 1210 includes a centrally located pass through 1212 and a lower circumferential toothed portion 1214.

Circumferential wall 1204, an inner bottom surface 1206, a retaining ring 1208 are configured to house gear system 1002 and to provide balance to moveable plate 904 such that moveable plate 904 can rotate freely around mounting plate 902. Circumferential wall 1204 stabilizes the distribution of weight on mounting plate 902. It should be noted that in some embodiments, retaining ring 1208 may be fitted with rollers to minimize friction of moveable plate 904 as moveable plate 904 rotates and revolves around mounting plate 902.

Figure 13:
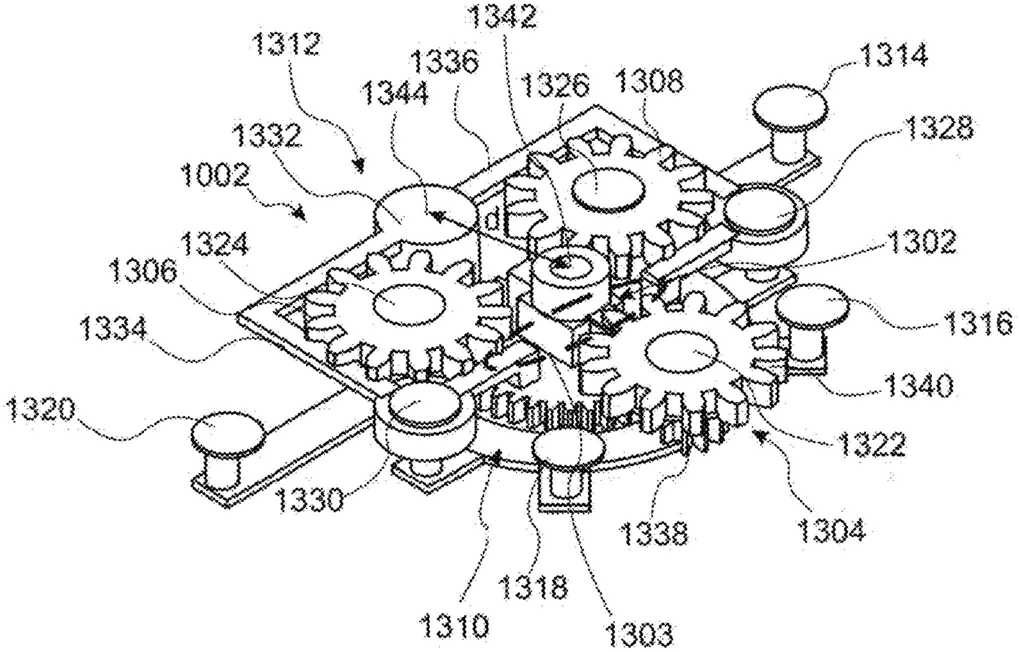
FIG. 13 illustrates an exploded oblique view of the gear system of FIG. 12.

FIG. 13 illustrates an exploded oblique view of gear system 1002.

As shown in the figure, gear system 1002 includes, a planetary gear 1302, compound planetary gears 1304, 1306, and 1308; a carriage 1310; an armature 1312; and retaining caps 1314, 1316, 1318, 1320, 1322, 1324, 1326, 1328, and 1330.

It should be noted that in this non-limiting example embodiment, gear system 1002 includes three compound planetary gears. However, in other embodiments a gear system may include any positive integer n compound planetary gears. Still further, in some embodiments, a gear system may include zero compound gears, wherein the planetary gear may itself turn moveable plate 904. In this non-limiting example embodiment, the three compound planetary gears additionally stabilize moveable plate 904 as it rotates.

As will be described in more detail below, armature 1312 is in mechanical communication with adaptor 1000 so as to rotate with rotation of adaptor 1000. Planetary gear 1302 resides in carriage 1310, which is mechanically connected to armature 1312 and is arranged to rotate and to revolve around inner sun gear 1210 with rotation of armature 1312. Each of compound planetary gears 1304, 1306, and 1308 resides in carriage 1310, which is connected to armature 1312 and is arranged to rotate about its respective center of axis and to revolve around inner sun gear 1210.

Armature 1312 includes a post portion 1332 and two arm portions 1334 and 1336, each extending from post portion 1332 and connected to carriage 1310. As will be described in greater detail below, armature 1312 is connected directly to adaptor 1000. Armature 1312 revolves carriage 1310 around inner sun gear 1210 and translates rotation of rotor adaptor 410 to gear system 1002.

As will be described in greater detail below, as armature 1312 revolves in conjunction with the microwave motor, planetary gear 1302 rotates around inner sun gear 1210 and then enables compound planetary gears 1304, 1306, and 1308 to rotate moveable plate 904.

As will be described in greater detail below, in some embodiments, a rotating magnet may be fixed to the center of the planetary gear 1302. The rotating magnet rotates with rotation of planetary gear 1302 and translates its rotational energy to the removable magnet to stir the food being cooked.

As will be described in greater detail below, carriage 1310 houses planetary gear 1302, and compound planetary gears 1304, 1306, and 1308. Carriage 1310 is designed to fit snuggly into the mounting plate 902 so as to maintain position of each of planetary gear 1302, and compound planetary gears 1304, 1306, and 1308 when platform system 900 is rotated or handled in an aggressive manner.

Retaining caps 1314, 1316, 1318, and 1320 engage retaining ring 1208 to prevent gear system 1002 from dislodging from mounting plate 902. Retaining caps 1322, 1324, and 1326 maintain a vertical position of compound planetary gears 1304, 1306, and 1308, respectively. Retaining caps 1328 and 1330 maintain a vertical position of carriage 1310.

As will be described in greater detail below, each of compound planetary gears 1304, 1306, and 1308 has a lower toothed gear portion and an upper toothed gear portion, an example of which is indicated as lower toothed gear portion 1338 and upper toothed gear portion 1340 of compound planetary gear 1304. Each of the lower toothed gear portions are configured to engage with planetary gear 1302.

In some embodiments, planetary gear 1302 includes a centrally located retaining cap hole 1342. As will be described in greater detail below, retaining cap hole 1342 will be plugged with a retaining cap. A center 1344 of post portion 1332 of armature 1312 is separated from a center of retaining cap hole 1342 by a distanced. As will be described in greater detail below, distance d is an offset for which a center of moveable plate 904 will revolve around a center of mounting plate 902. In other words, center 1344 of post portion 1322 corresponds to the center of mounting plate 902 and cooking space 302, whereas the center of retaining cap hole 1342 corresponds to the center of moveable plate 904.

It should be noted that in some embodiments, a magnet 1303 is disposed at planetary gear 1302, wherein magnet 1303 is arranged to rotate with planetary gear 1302. As will be described in greater detail below, in some embodiments, magnet 1303 is configured to produce a magnetic field that rotates with the rotation of rotating magnet 1303.

Figure 14A:
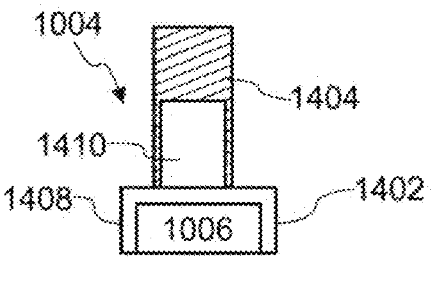
FIG. 14A illustrates a cross-sectional view of an adjustable mount of the example platform system of FIG. 11 at a time $t_2$.

FIG. 14A illustrates a cross-sectional view of adjustable mount 1004 of platform system 900 at a time $t_2$.

As shown in the figure, adjustable mount 1004 includes a mount magnet 1006, a foot 1402 and an internally threaded leg 1404. Foot 1402 includes a threaded insert portion 1410 and a cover portion 1408. Cover portion 1408 is configured to house mount magnet 1006, wherein threaded insert portion 1410 is configured to wind up into and wind down out of threaded leg 1404. At time $t_2$ threaded insert portion 1410 is completely wound up into threaded leg 1404.

Figure 14B:
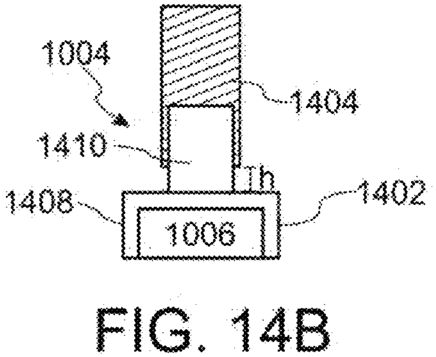
FIG. 14B illustrates the cross-sectional view of an adjustable mount of FIG. 14A at a time $t_3$.

FIG. 14B illustrates the cross-sectional view of an adjustable mount of FIG. 14A at a time $t_3$.

As shown in the figure, threaded insert portion 1410 is somewhat wound down out of threaded leg 1404. Accordingly, threaded leg 1404 is raised by a height h. Returning to FIG. 10, by adjusting all adjustable mounts, height 1012 may be adjusted such that platform system 900 may universally fit many different microwave ovens having many differently sized rotor adaptors and varying contours of bottom surface 1010. In particular, the contour of the bottom surface a microwave may differ between different manufacturers. Accordingly, being able to adjust the height of mounting plate 902 enable a more universal system.

Figure 15:
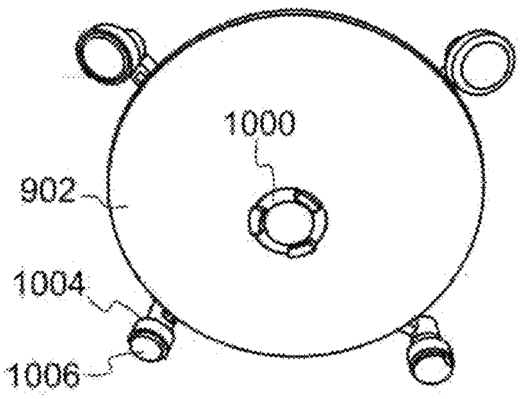
FIG. 15 illustrates a plan view of the underside of the mounting plate of FIG. 12.

FIG. 15 illustrates a plan view of the underside of mounting plate 902, showing adaptor 1000 and the plurality of adjustable mounts, a sample of which is indicated as adjustable mount 1004 with mount magnet 1006.

Figure 16:
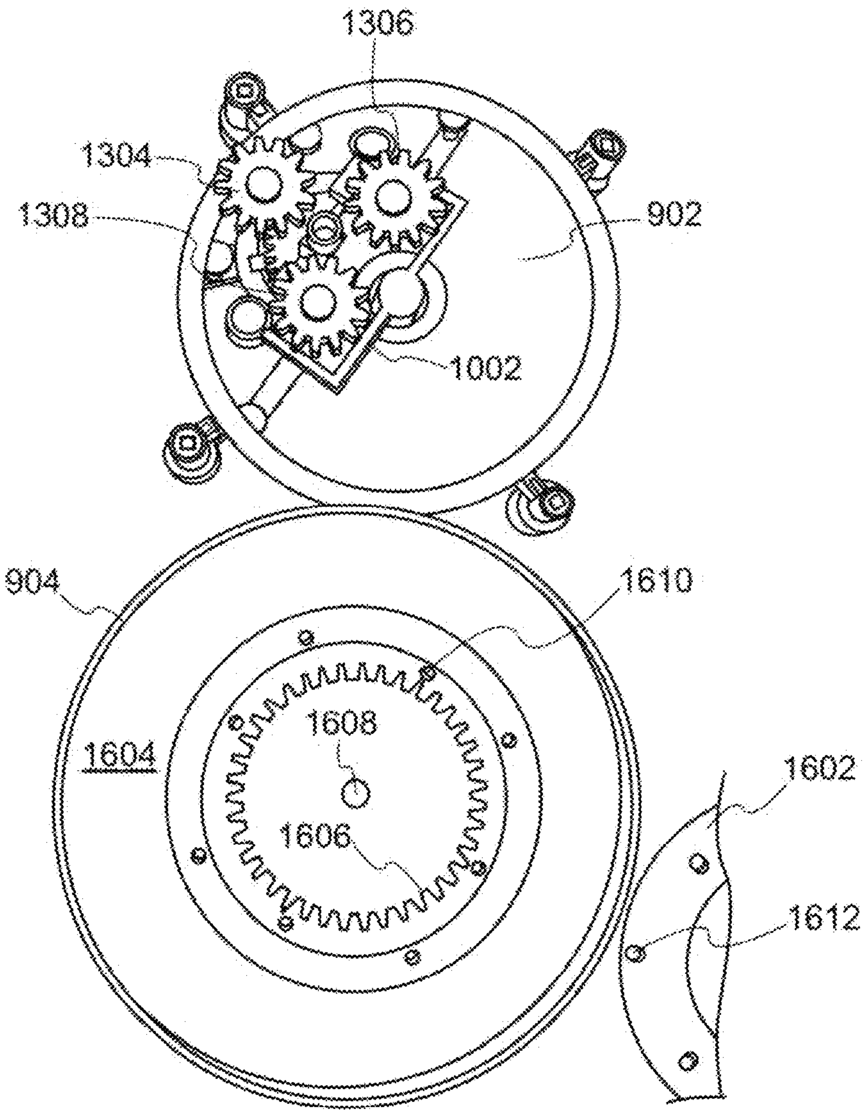
FIG. 16 illustrates a plan view of the top side of the mounting plate and gear system of FIG. 12, the underside the movable plate and a retaining ring of the example platform system of FIG. 11.

FIG. 16 illustrates a plan view of the top side of mounting plate 902 and gear system 1002, an underside 1604 of movable plate 904 and a retaining ring 1602 of platform system 900.

As shown in the figure, underside 1604 includes a fixed toothed ring 1606, a retaining cap hole 1608, and a plurality of holes 1610. Retaining ring 1602 includes a plurality of projections 1612.

Fixed toothed ring 1606 is configured to engage with planetary gears 1304, 1306 and 1308, when moveable plate 904 is mounted onto mounting plate 902. As such, rotation of planetary gears 1304, 1306 and 1308 will rotate movable plate 903.

Plurality of projections 1612 are configured to insert into plurality of holes 1610 when retaining ring 1602 is mounted onto fixed toothed ring 1606. This will be described in greater detail with reference to FIG. 17.

Figure 17:
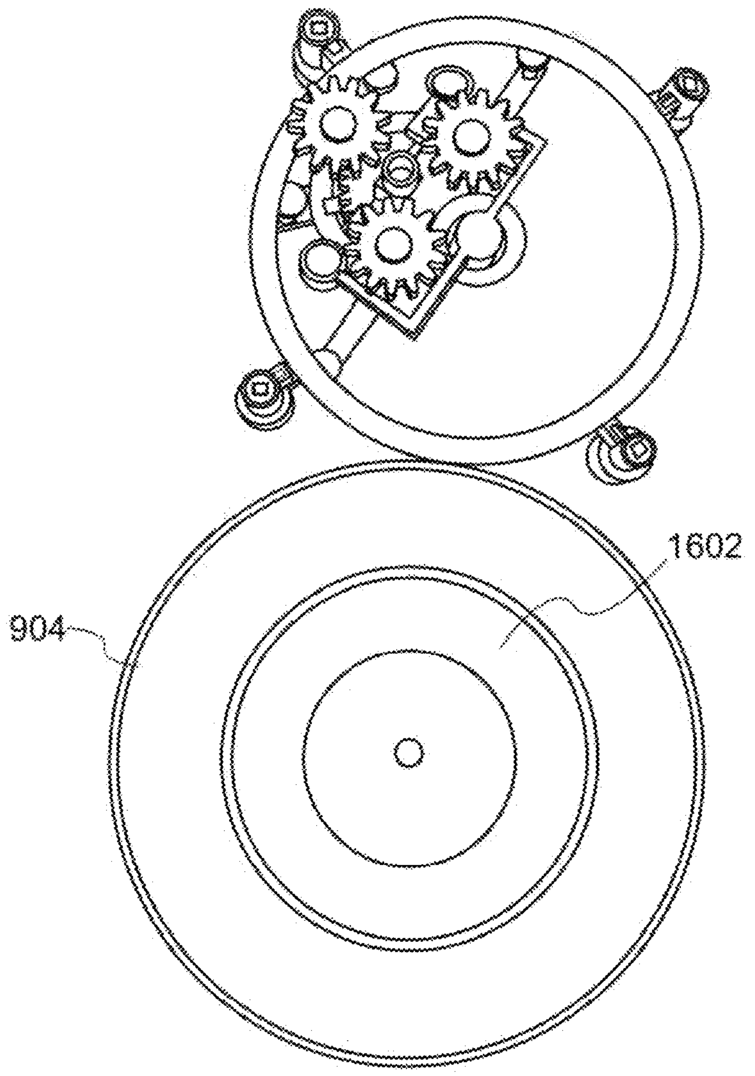
FIG. 17 illustrates a plan view of the top side of the mounting plate and gear system of FIG. 16, and the underside the movable plate and the retaining ring assembled thereon.

FIG. 17 illustrates a plan view of the top side of mounting plate 902 and gear system 1002, and underside 1604 of movable plate 903 with retaining ring 1602 assembled thereon. Retaining ring 1602 maintains planetary gears 1304, 1306 and 1308 in connection with moveable plate 904, and keeps platform system 900 together if it is turned upside down or handled aggressively.

Returning to FIG. 10, in operation, when cooking in microwave 300, motor 402 rotates rotor 404 at a predetermined angular velocity ω. Rotating rotor 404 in turn rotates rotor adaptor 410 at angular velocity ω.

Returning to FIG. 15, adaptor 1000 is configured to engage rotating rotor adaptor 410, in a manner similar to that discussed above with reference to FIGS. 5-6. As such, adaptor 1000 rotates at angular velocity ω.

Returning to FIG. 13, post portion 1332 of armature 1312 is connected to adaptor 1000, such that as adaptor 1000 rotates at angular velocity ω, post portion 1332 rotates at angular velocity ω.

Returning to FIG. 12, inner sun gear 1210 engages with gear system 1002. In particular, as shown in FIG. 13, planetary gear 1302 engages with inner sun gear 1210. Accordingly, as post portion 1332 rotates, planetary gear 1302 revolves around inner sun gear 1210. Based on the tooth ratio of inner sun gear 1210 and planetary gear 1302, planetary gear 1302 may revolve around inner sun gear at an angular velocity λ that is different from the angular velocity ω of rotating post portion 1332. However, in some embodiments, planetary gear 1302 may revolve around inner sun gear at an angular velocity λ that is the same as the angular velocity ω of rotating post portion 1332, wherein ω equals λ.

In any event, the revolution of planetary gear 1302 around inner sun gear 1210 thus revolves the group of compound planetary gears 1304, 1306, and 1308 around inner sun gear 1210 via armature 1312 and carriage 1310.

While revolving around inner sun gear 1210, the lower toothed gears, an example of which is indicated as lower toothed gear portion 1338 of compound planetary gear 1304 is engaged with planetary gear 1302. Accordingly each of compound planetary gears 1304, 1306, and 1308, additionally rotate. Based on the tooth ratio between planetary gear 1302 and lower toothed gear portion 1338, compound planetary gear 1304 may rotate at an angular velocity δ that is different from the angular velocity λ of planetary gear 1302. However, in some embodiments, compound planetary gear 1304 may rotate at an angular velocity δ that is the same as the angular velocity λ of planetary gear 1302, wherein δ equals λ.

Returning to FIG. 16, when moveable plate 904 is mounted onto mounting plate 902, compound planetary gears 1304, 1306, and 1308 are engaged with fixed toothed ring 1606. More particularly, as shown in FIG. 13, the upper toothed gears, an example of which is indicated as upper toothed gear portion 1340 of compound planetary gear 1304, is engaged with fixed toothed ring 1606. Accordingly as each of compound planetary gears 1304, 1306, and 1308 rotate, moveable plate 904 additionally rotates at an angular velocity δ.

Accordingly, the revolution of gear system 1002 about inner sun gear 1210 revolves moveable plate 904 about mounting plate 902, wherein the center of moveable plate 904 is off-set from the center of mounting plate 902 by distance d as discussed above with reference to FIG. 13. Further, the rotation of each of compound planetary gears 1304, 1306, and 1308 simultaneously rotates moveable plate 904.

Therefore, returning to FIG. 9A, moveable plate 904 has an overall revolution about cooking space 302 at an angular velocity δ and has rotation about cooking space 302 at an angular velocity ω. Therefore, any food on moveable plate 904 will pass through many lower heating areas and higher heating areas throughout cooking space 302, thus producing a more even heating. This will be described in greater detail with reference to FIGS. 9B-C.

Figure 9B:
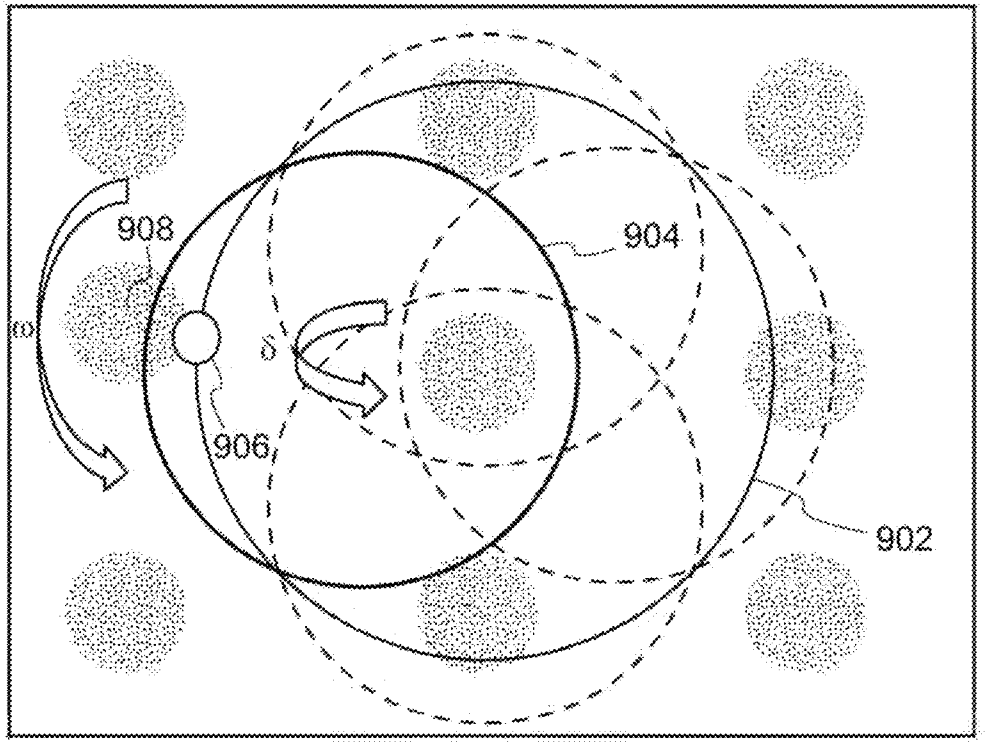
FIG. 9B illustrates the position of a representative portion of food on the platform system of FIG. 9A at time $t_1$.

FIG. 9B illustrates the position of a representative portion of food 906 on platform system 900 at time $t_1$.

As shown in the figure, moveable plate 904 is located to the left side of the figure as represented by the solid circle. For purposes of discussion, let portion of food 906 be located as indicated in the figure. In this example, moveable plate 904 is revolving at angular velocity ω. Further, moveable plate 904 is further rotating an angular velocity δ. At this time, portion of food 906 is disposed in a higher heating area 908.

Figure 9C:
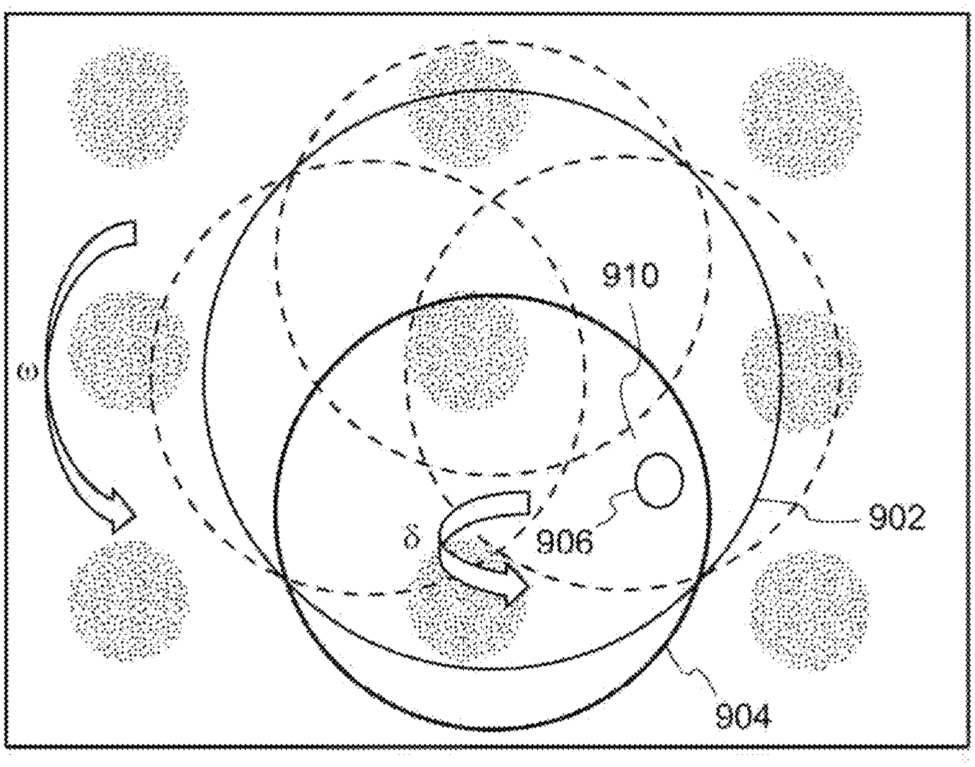
FIG. 9C illustrates the position of a representative portion of food on the platform system of FIG. 9A at time $t_5$.

FIG. 9C illustrates the position of representative portion of food 906 on platform system 900 at a time $t_5$.

As shown in the figure, moveable plate 904 is located to the bottom side of the figure as represented by the solid circle. Again, moveable plate 904 is revolving at angular velocity ω. Further, moveable plate 904 is further rotating an angular velocity δ. At this time, portion of food 906 is disposed in a lower heating area 910.

By rotating and revolving, platform system 900 is able to pass food through many different lower and higher heating areas, thus producing a more even heating.

Because of the automatic rotating and revolving movement of moveable plate 904, all parts of food being cooked in microwave oven 300 has an increased chance to pass through many nodes and anti-nodes as it revolves around cooking space 302 at an angular velocity ω and rotates around cooking space 302 at an angular velocity δ, without the need for the user to stop microwave oven 300 and manually rotate the food. This leads to more even heating of the food.

While the embodiments discussed above with reference to FIGS. 9A-17 greatly improve the evenness in heating of food, there are sometimes that the evenness can be further improved. In particular, superheated pockets may develop within liquid-based fares. If unabated, those pockets can lead to an explosive mess within the microwave cavity, also known as splatter. Stirring breaks up those pockets, breaks up surface tension, which is another contributor to a superheating effect, and allows their heat to be conducted throughout the liquid-based fare. For foods that are subject to this shortcoming, a person is encouraged to cover the food and stop it mid-cycle to stir it.

An example system and method for stirring liquids and light fair while using the rotating and revolving microwave insert in accordance with aspects of the present disclosure will now be described in greater detail with reference to FIGS. 18-21B.

In accordance with this aspect of the present disclosure, a magnet disposed at planetary gear, is arranged to rotate with planetary gear and is configured to produce a magnetic field that rotates with rotation of the rotating magnet. Further, a removable magnet is to be disposed in bowl of food to be stirred and is configured to magnetically align with a rotating magnetic field of the rotating magnet so as to rotate within the food so as to stir the food.

Figure 18:
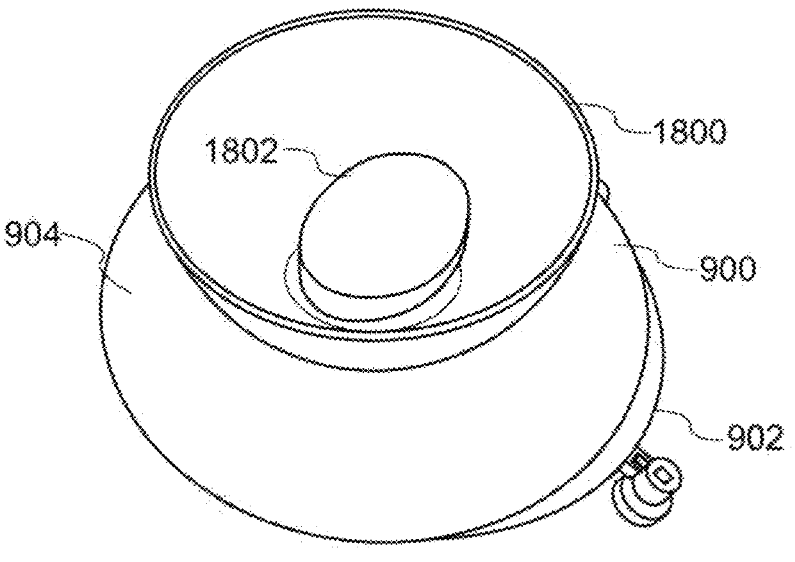
FIG. 18 illustrates an oblique view of the example platform system of FIG. 11, a bowl, and a removable magnet disposed within the bowl in accordance with aspects of the present disclosure.

FIG. 18 illustrates an oblique view of platform system 900, a bowl 1800, and a removeable magnet 1802 disposed within bowl 1800 in accordance with aspects of the present disclosure. As will be described in greater detail below, when cooking in a microwave oven, removeable magnet 1802 will be able to rotate and stir the liquid or light fare, thus breaking up pockets subject to superheating and allowing their heat to be conducted throughout the liquid-based fare. This will be described in greater detail with reference to FIGS. 19-21B.

Figure 19:
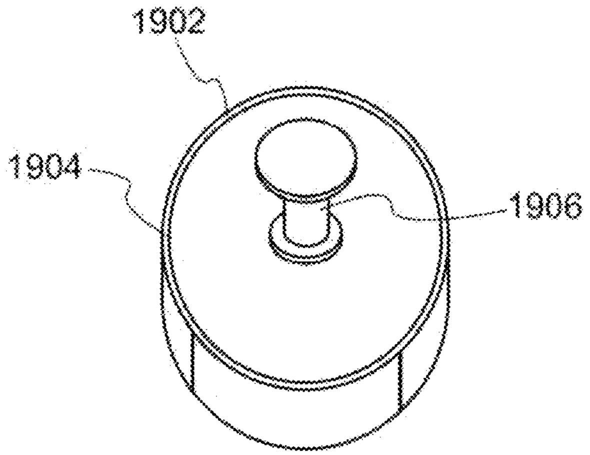
FIG. 19 illustrates another example of a removable magnet in accordance with aspects of the present disclosure.

FIG. 19 illustrates another example embodiment of a removeable magnet 1902 to be disposed within bowl 1800 in accordance with aspects of the present disclosure.

As shown in the figure, removeable magnet 1902 includes a magnetic body 1904 and a handle 1906. Handle 1906 enables a user to easily place removeable magnet 1902 within bowl 1800 and to remove removeable magnet 1902 from bowl 1800.

Figure 20:
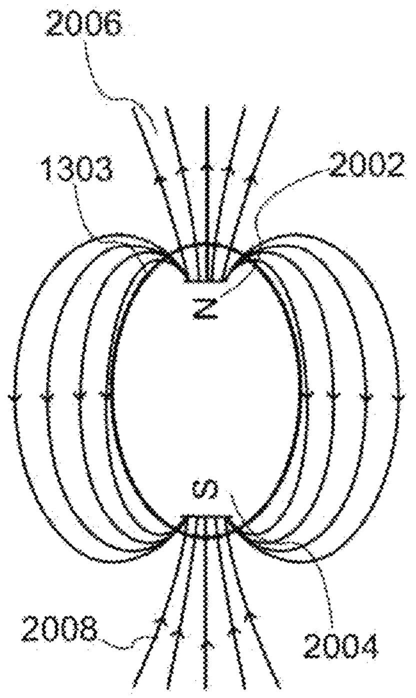
FIG. 20 illustrates magnetic field lines of the magnet of FIG. 19.

FIG. 20 illustrates magnetic field lines of magnet 1303. As shown in the figure, magnet 1303 has a north pole 2002 and a south pole 2004. Magnetic field lines are illustrated as leaving north pole 2002 as indicated by lines 2006. The magnetic field lines loop back to enter into south pole 2004 as indicated by magnetic field lines 2008.

In operation, magnet 1303 rotates with planetary gear 1302 such that the magnetic field of magnet 1303 additionally rotates. This rotating magnetic field causes removeable magnet 1802 to rotate and stir the liquid in bowl 1800. This will be described in greater detail with reference to FIGS. 21A-B.

Figure 21A:
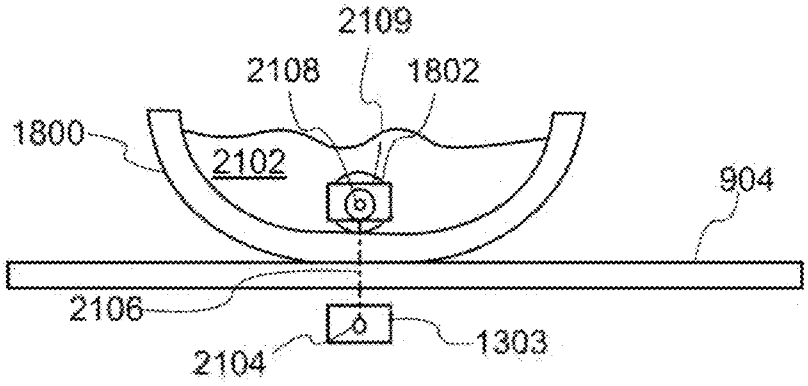
FIG. 21A illustrates a cross-sectional view of the moveable plate, the bowl, and the removable magnet of FIG. 18 and the magnet in a planetary gear at a time $t_6$ in accordance with aspects of the present disclosure.

FIG. 21A illustrates a cross-sectional view of moveable plate 904, magnet 1303, bowl 1800 containing light fare 2102, and removable magnet 1802 at a time $t_6$ in accordance with aspects of the present disclosure.

As shown in the figure, removeable magnet 1802 is disposed in light fare 2102 within bowl 1800. Magnet 1303 is arranged such that the magnetic field lines area leaving the north pole and exiting out of the figure as represented by dot 2104. Some of the exiting magnetic field lines are drawn to the south pole of removeable magnet 1802 as indicated by dotted line 2106. Removeable magnet 1802 is arranged such that the magnetic field lines area entering the south pole and entering into the figure as represented by circled dot 2108.

As magnet 1303 rotates, so do the corresponding magnetic field lines, which in turn causes removeable magnet 1802 to correspondingly rotate. Removeable magnet 1802 includes a protrusion 2109 in the middle of its sides. Protrusion 2109 reduces the amount of surface area of removable magnet 1802 that is in contact with bowl 1800. As such, the friction between rotating removeable magnet 1802 and bowl 1800 is drastically reduced. This will be described in greater detail with reference to FIG. 21B.

Figure 21B:
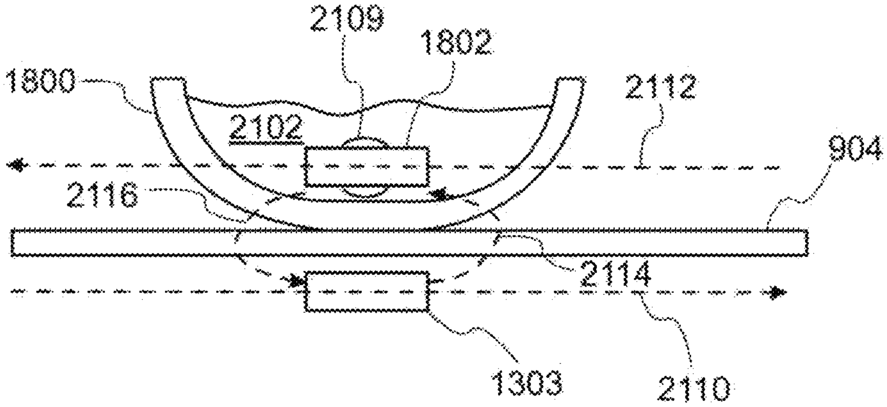
FIG. 21B illustrates a cross-sectional view of the moveable plate, the bowl, and the removable magnet of FIG. 18 and the planetary gear at a time $t_7$ in accordance with aspects of the present disclosure.

FIG. 21B illustrates a cross-sectional view of the moveable plate, the bowl, and the removable magnet of FIG. 18 and the magnet of FIG. 19 at a time $t_7$ in accordance with aspects of the present disclosure.

As shown in the figure, magnet 1303 has rotated 90°, such that the magnetic field lines area leaving the north pole and exiting from magnet 1303 and proceeding to the right as illustrated by dotted arrow 2110. Some of the exiting magnetic field lines are drawn to the south pole of removeable magnet 1802 as indicated by dotted curved line 2114. Removeable magnet 1802 is arranged such that the magnetic field lines area and leaving the north pole and exiting from removable magnet 1802 and proceeding to the left as illustrated by dotted arrow 2112. Some of the exiting magnetic field lines are drawn to the south pole of magnet 1303 as indicated by dotted curved line 2116.

Because of the coupling of the magnetic fields of magnet 1303 and removeable magnet 1802, removeable magnet 1802 rotates in conjunction with the rotation of magnet 902. As removeable magnet 1802 rotates within light fare 2102, light fare 2102 is stirred. This constant automatic stirring of light fare 2102 reduces the chances of superheated pockets develop within light fare 2102, thus reducing the occurrence of an explosive mess within cooking space 302.

In the above discussed example embodiments, a single moveable plate rotates and revolves within cooking space 302 of microwave oven 300. However, in other embodiments, multiple moveable plates may revolve within cooking space 302, wherein each moveable plate additional rotates at a respective angular velocity.

Rotation of multiple plates potentially creates the ability to satisfactorily microwave dissimilar foods during the same heating cycle. This is based upon the observation that as a plate rotation increases, the rate of energy absorption decreases slowing down the cooking process. A multiple plate with a housing that turns each plate at different rates enables different types of food to be cooked at optimal rates within the same cooking time.

An example revolving microwave insert with multiple rotating plates in accordance with aspects of the present disclosure will now be described in greater detail with reference to FIG. 22.

Figure 22:
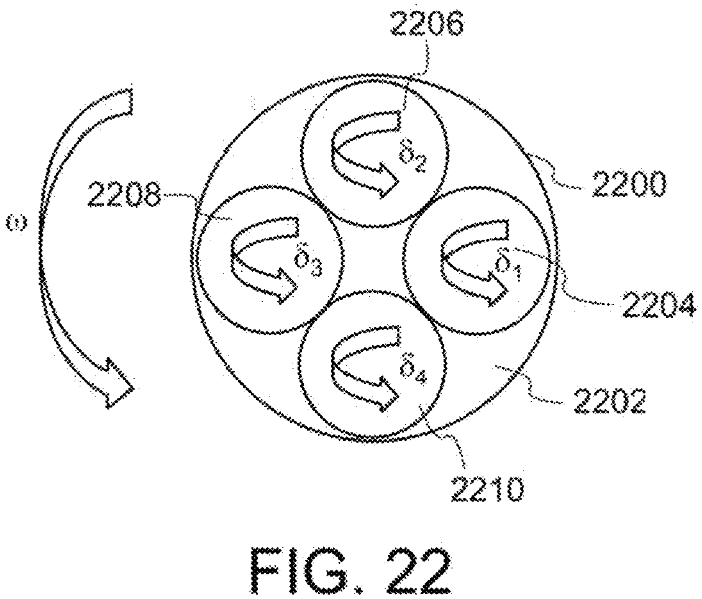
FIG. 22 illustrates a plan view of another example platform system in accordance with aspects of the present disclosure.

FIG. 22 illustrates a plan view of another example platform system 2200 in accordance with aspects of the present disclosure.

As shown in the figure, platform system 200 includes a mounting plate 2202 and moving plates 2204, 2206, 2208, and 2210. In this embodiments, mounting plate 2202 may rotate with an angular velocity ω in a manner similar to that discussed above with reference to mounting plate 902.

Further, each of moving plates 2204, 2206, 2208, and 2210 may additionally rotate in a manner similar to moving plate 904 discussed above. It should be noted that in these embodiments, each of moving plates 2204, 2206, 2208, and 2210, may be in communication with a respective gear system similar gear system 1002 discussed above.

Further, in these embodiments, each of moving plates 2204, 2206, 2208, and 2210 may rotate at an angular velocity of $\delta_1$, $\delta_2$, $\delta_3$, and $\delta_4$, respectively, wherein the respective angular velocity is based on a ratio of the teeth of the respective compound planetary gears with reference to the compound planetary gear. It should be noted that while, moving plates 2204, 2206, 2208, and 2210 may rotate at different respective angular velocities, moving plates 2204, 2206, 2208, and 2210 will revolve about the cooking space at the same angular velocity.

In these embodiments, a platform system may additionally include a second gear system; and a second moveable plate, wherein second gear system is in mechanical communication with adaptor 1000 so as to move with rotation of adaptor 1000. One moveable plate, for example moveable plate 2204, is configured to support a bowl or plate of food and to rotate about cooking space 302 at an angular velocity $\delta_1$. Another moveable plate, for example moveable plate 2206, is configured to support the second bowl or plate of food and to rotate and revolve about cooking space 302 based on motion of second gear system so as to rotate and revolve the second bowl or plate of food about cooking space 302 at a second angular velocity $\delta_2$, that is different than angular velocity $\delta_1$.

It should be noted that in these embodiments, any or all moveable plates may include a rotatable magnet disposed on a respective planetary gear.

The above-discussed example embodiments describe platform systems to be used with a microwave oven. However, in accordance with another aspect of the present disclosure a rotating and revolving plate system may be incorporated into a microwave oven. This will be described in greater detail with reference to FIG. 23.

Figure 23:
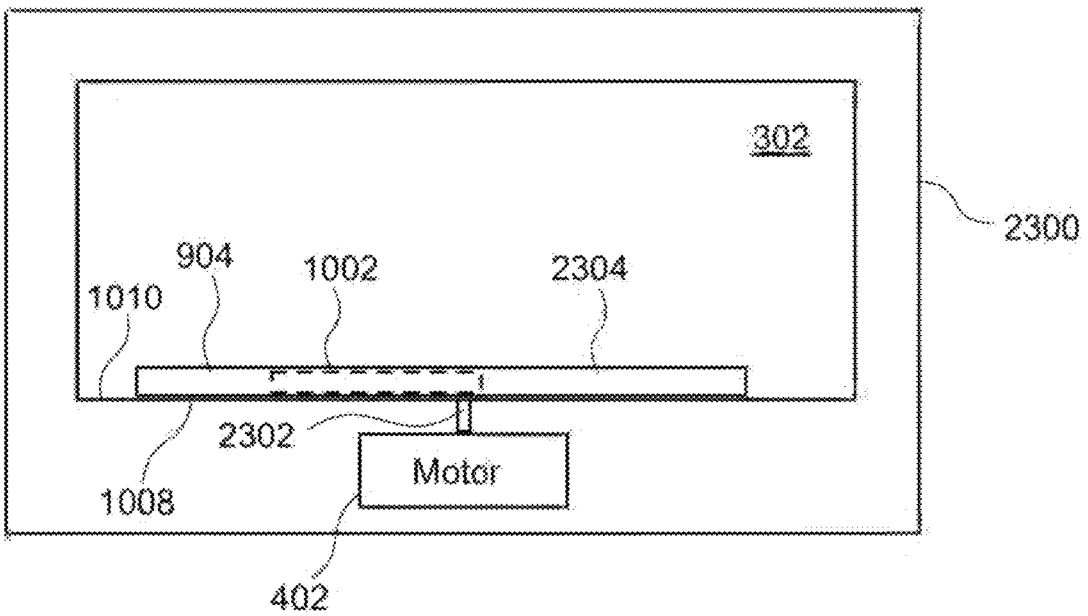
FIG. 23 illustrates an example microwave oven having a rotating and revolving plate in accordance with aspects of the present disclosure.

FIG. 23 illustrates an example microwave oven 2300 having a rotating and revolving platform system 2304 in accordance with aspects of the present disclosure.

As shown in the figure, microwave 2300 differs from microwave 300 in that: microwave 2300 replaces rotor 404 with rotor 2302; replaces platform system 900 with platform system 2304; and removes mounting plate 902 and the plurality of adjustable mounts. In short, in these embodiments, rotor 2302 connects directly to gear system 1002, such that moveable plate 904 is disposed on bottom surface 1010 of cooking space 302. As such, platform system 2304 may be sized for a particular microwave.

In some embodiments, platform system 2310 is removable such that a user may readily clean bottom surface 1010.

This embodiment may additionally implement a removeable magnet to stir light fare in a manner similar to that discussed above with reference to FIGS. 18-21B. Further, this embodiment may additionally implement a plurality of moving plates in a manner similar to that discussed above with reference to FIG. 22.

It should be noted that all elements, with the exception of the magnetic elements, of the example platform systems may be made of any know microwave oven-safe material, non-limiting examples of which include plastics, glass, porcelain, and combinations thereof. The removeable magnets may be encased in any known a microwavable-food-save encasement material.

The foregoing description of various preferred embodiments have been presented for purposes of illustration and description. It is not intended to be exhaustive or to limit the disclosure to the precise forms disclosed, and obviously many modifications and variations are possible in light of the above teaching. The example embodiments, as described above, were chosen and described in order to best explain the principles of the disclosure and its practical application to thereby enable others skilled in the art to best utilize the disclosure in various embodiments and with various modifications as are suited to the particular use contemplated. It is intended that the scope of the disclosure be defined by the claims appended hereto.

What is claimed is:

1. A platform system for use to support an item to be cooked in a microwave oven having a motor, a cooking space having a bottom surface, and a rotor centrally located at the bottom surface, the motor being disposed outside of the cooking space and being configured to rotate the rotor, said platform system comprising:

an adaptor;

a mounting plate having a mounting plate center;

a gear system; and a moveable plate having a moveable plate center that is offset from said mounting plate center by a distance d, wherein said adaptor is configured to engage the or a d thereby rotate with the rotor, wherein said gear system is in mechanical communication with said adaptor so move with rotation of said adaptor, and wherein said moveable plate is configured to cover said mounting plate center and to support the item and to rotate and revolve about the cooking space based on motion of said gear system so as to rotate and to revolve the item about the cooking space.

2. The platform system of claim 1, wherein said gear system is disposed between said mounting plate and said moveable plate, and wherein said mounting plate is disposed between said adaptor and said gear system.

3. The platform system of claim 2, wherein said gear system comprises:

an inner sun gear;

a carriage;

an armature in mechanical communication with said adaptor and said carriage so as to revolve said carriage about said inner sun gear with rotation of said adaptor;

planetary gear mounted within said carriage and arranged to rotate and to revolve around said inner sun gear with rotation of said armature; and a compound planetary gear connected to said carriage and arranged to rotate and to revolve around said inner sun gear, wherein said moveable plate has a top surface and a bottom surface, said top surface being configured to support the item, said bottom surface including a toothed ring configured to engage with said compound planetary gear.

4. The platform system of claim 3, wherein said mounting plate comprises:

an under surface configured to be disposed to face the bottom surface of the cooking space; and a plurality of adjustable mounts, each being configured to adjust its respective height so as to collectively adjust a space between said under surface of said mounting plate and the bottom surface of the cooking space.

5. The platform system of claim 4, further comprising a mount magnet disposed at one of said plurality of adjustable mounts and being configured to magnetically attract said one of said plurality of adjustable mounts to the bottom surface of the cooking space so as to prevent rotation of said one of said plurality of adjustable mounts about the bottom surface of the cooking space.

6. The platform system of claim 2, wherein said mounting plate comprises:

an under surface configured to be disposed to face the bottom surface of the cooking space; and a plurality of adjustable mounts, each being configured to adjust its respective height so as to collectively adjust a space between said under surface of said mounting plate and the bottom surface of the cooking space.

7. The platform system of claim 6, further comprising a mount magnet disposed at one of said plurality of adjustable mounts and being configured to magnetically attract said one of said plurality of adjustable mounts to the bottom surface of the cooking space so as to prevent rotation of said one of said plurality of adjustable mounts about the bottom surface of the cooking space.

8. The platform system of claim 1, wherein said gear system comprises:

an inner sun gear;

a carriage;

an armature in mechanical communication with said adaptor and said carriage so as to revolve said carriage about said inner sun gear with rotation of said adaptor;

a planetary gear mounted within said carriage and arranged to rotate and to revolve around said inner sun gear with on of said armature; and a compound planetary gear connected to said carriage and arranged to rotate and to revolve around said inner sun gear;

wherein said moveable plate has a top surface and a bottom surface, said top surface being configured to support the item, said bottom surface including a toothed ring configured to engage with said compound planetary gear.

9. The platform system of claim 8, ere aid mounting plate comprises:

an under surface configured to be disposed to face the bottom surface of the cooking space; and a plurality of adjustable mounts, each being configured to adjust its respective height so as to collectively adjust a space between said under surface of said mounting plate and the bottom surface of the cooking spaces.

10. The platform system of claim 9, further comprising a mount magnet disposed at one of said plurality of adjustable mounts and being configured to magnetically attract said one of said plurality of adjustable mounts to the bottom surface of the cooking space so as to prevent rotation of said one of said plurality of adjustable mounts about the bottom surface of the cooking space.

11. The platform system of claim 8, for further us port a bowl to contain a material as the item to be cooked in the microwave oven, said platform system further comprising:

a rotating magnet disposed at said planetary gear, arranged to rotate with said planetary gear and configured to produce a magnetic field that rotates with the rotation of said rotating magnet; and a removable magnet to be disposed in the bowl and configured to magnetically align with the rotating magnetic field of said rotating magnet so as to rotate within the material in the howl so as to stir the material in the bowl.

12. The platform system of claim 1, wherein said mounting plate comprises:

an under surface configured to be disposed to face the bottom surface of the cooking space, and a plurality of adjustable mounts, each being configured to adjust its respective height so as to collectively adjust a space between said under surface of said mounting plate and the bottom surface of the cooking space.

13. The platform system of claim 12, further comprising a mount magnet disposed at one of said plurality of adjustable mounts and being configured to magnetically attract said one of said plurality of adjustable mounts to the bottom surface of the cooking space so as to prevent rotation of said one of said plurality of adjustable mounts about the bottom surface of the cooking space.

14. The platform system of claim 13, wherein said mount magnet comprises a material selected from the group of materials consisting of ceramics, neodymium, graphene, and combinations thereof.

15. A platform system for use to support an item and a second item to be cooked in a microwave oven h vine a motor, a cooking pace having a bottom surface, and a rotor centrally located at the bottom surface, the motor being disposed outside of the cooking space and being configured to rotate the rotor, said platform system comprising:

an adaptor;

a mounting plates;

a gear system;

a moveable plate; and a second moveable plate, wherein said adaptor is configured to engage the motor and thereby rotate with the rotor;

wherein said gear system is in mechanical communication with said adaptor so as to move with rotation of said adaptor, wherein said moveable plate is configured to support the item and to rotate and revolve about the cooking space based on motion of said gear system so as to rotate and to revolve the item about the cooking space, wherein said adaptor is configured to engage the rotor and thereby rotate with the rotor, wherein said moveable plate is configured to support the item and to rotate at a first angular velocity, and wherein said second moveable plate is configured to support the second item and to rotate at a second angular velocity that is different than the first angular velocity.

16. The platform system of claim 15, wherein said gear system is disposed between said mounting plate and said second moveable plate, and wherein said mounting plate is disposed between said adaptor and said gear system.

17. A microwave for use with an item to be cooked, said microwave oven comprising:

a cooking space having a bottom surface having a bottom surface center;

a rotor located at said bottom surface center;

a motor being disposed outside of said cooking space and being configured to rotate said rotor; and platform system comprising:

a gear system; and a moveable plate having a movable plate center that is offset from said bottom surface center by a distance d, wherein said gear system is in mechanical communication with said rotor so as to move with rotation of said rotor, and wherein said moveable plate is configured to cover said bottom surface center and to support the item and to rotate and revolve about said cooking space based on motion of said gear system so as to rotate and to revolve the item about said cooking space.

18. The microwave oven of claim 17, wherein said gear system is disposed below said moveable plate.

19. The microwave oven of claim 17, wherein said gear system comprises:

an inner sun gear in mechanical communication with said rotor so as to rotate with rotation of said rotor;

a carriage;

an armature in mechanical communication aid rotor and said carriage so as to revolve said carriage about said inner sun gear with rotation of said rotor;

a planetary gear mounted within said carriage and arranged to rotate and revolve around said inner sun gear with rotation of said armature; and a compound planetary gear connected to said carriage and arranged to revolve around said inner sun gear, wherein said moveable plate has a top surface and a bottom surface, said top surface being configured to support the item, said bottom surface including a toothed ring configured to engage with said compound planetary gear.

20. The microwave oven of claim 19, for further use to support a bowl to contain a material as the item to be cooked, said platform system further comprising:

a rotating magnet disposed at said planetary gear, arranged to rotate with said planetary gear and configured to produce a magnetic field that rotates with the rotation of said rotating magnet; and a removable magnet to be disposed in the bowl and configured to magnetically align with the rotating magnetic field of said rotating magnet so as to rotate within the material in the bowl so as to stir the material in the bowl.

* * * * *